(12) United States Patent
Meggiolan

(10) Patent No.: US 6,597,166 B2
(45) Date of Patent: Jul. 22, 2003

(54) INTEGRATED CONTROL AND POWER SUPPLY FOR BICYCLES

(75) Inventor: Mario Meggiolan, Venice (IT)

(73) Assignee: Campagnolo Srl (IT)

( * ) Notice: Subject to any disclaimer, the term of this patent is extended or adjusted under 35 U.S.C. 154(b) by 0 days.

(21) Appl. No.: 09/984,666

(22) Filed: Oct. 30, 2001

(65) Prior Publication Data

US 2002/0052258 A1 May 2, 2002

(30) Foreign Application Priority Data

Oct. 31, 2000 (IT) ..................................... TO2000A1027

(51) Int. Cl.⁷ ................................................ G01P 3/48
(52) U.S. Cl. ...................................... 324/174; 23/865.9
(58) Field of Search ................................ 324/174, 173, 324/171, 207.25, 207.2, 207.22, 168, 166; 73/379, 519, 512, 865.9; 474/70, 80

(56) References Cited

U.S. PATENT DOCUMENTS

| 675,390 A | 6/1901 | Keating |
| 3,995,491 A | * 12/1976 | Wolfla ........................ 73/379 |
| 4,780,864 A | * 10/1988 | Houlihan ..................... 368/10 |
| 4,948,080 A | 8/1990 | Jack |
| 1,439,430 A | 12/1992 | Lyhne |
| 5,170,981 A | 12/1992 | Lin |
| 5,177,432 A | * 1/1993 | Waterhouse et al. ........ 324/166 |
| 5,199,619 A | 4/1993 | Mostashari |
| 5,276,593 A | 1/1994 | Lighthill et al. |
| 5,423,509 A | 6/1995 | LaPorta |
| 5,570,752 A | 11/1996 | Takata |
| 5,803,328 A | 9/1998 | Nakahara |
| 6,095,270 A | 8/2000 | Ishikawa |
| 6,286,983 B1 | 9/2001 | Tashiro |
| 6,423,443 B1 | 7/2002 | Tsuboi et al. |
| 2001/0042767 A1 | 11/2001 | Campagnolo |
| 2002/0052258 A1 | 5/2002 | Meggiolan |

FOREIGN PATENT DOCUMENTS

JP          002571          1/2002

* cited by examiner

*Primary Examiner*—Edward Lefkowitz
*Assistant Examiner*—Subhash Zaveri
(74) *Attorney, Agent, or Firm*—Volpe and Koenig, P.C.

(57) ABSTRACT

An integrated control-unit and power-supply assembly usable on board a bicycle includes a box for containing an electronic control unit, the box being fixable to the down tube of the bicycle in the area where the bottle cage is fixed, or else underneath the crank case, and being provided with a receptacle-like tubular appendage which receives, by fast-coupling means, the end of a cylindrical battery holder. One end of the cylindrical battery holder carries a sensor device, for example a magnetically operated sensor, which is set at a distance from the crank pin that is substantially equal to the length of the crank arm. The sensor co-operates with a permanent magnet carried by one of the pedals to emit a pulse at each revolution of the crank arms. The assembly according to the invention can be exploited for carrying one or more sensors, of any type.

38 Claims, 2 Drawing Sheets

INTEGRATED CONTROL AND POWER SUPPLY FOR BICYCLES

BACKGROUND OF THE INVENTION

The present invention relates to an integrated control-unit and power-supply assembly usable on board a bicycle, including a box for containing an electronic control unit and a container for one or more electric power-supply batteries, the said battery holder being connected to the control-unit box.

Devices of the type referred to above have already formed the subject of the previous U.S. patent application Ser. No. 10/193,009 filed by the present applicant on Jul. 11 2002.

SUMMARY OF THE INVENTION

The purpose of the present invention is to improve further the assembly previously proposed by providing it with additional advantageous functions.

With a view to achieving the above purpose, the subject of the present invention is an integrated control-unit and power-supply assembly of the type indicated at the beginning of the present description, characterized in that at least one sensor device is mounted on at least one between said battery holder and said control-unit box.

In a preferred embodiment, the aforesaid sensor device is mounted on the battery holder. The aforesaid sensor device may be one of the various sensor devices that are present on modern bicycles, in particular on racing bicycles, in order to enable, for instance, display of the various parameters (speed, pedal cadence, etc.) on a display mounted on the handlebars of the bicycle. A sensor of this type is, for example, a pedal cadence sensor, which typically consists of a magnetic-activation sensor which is set on the frame of the bicycle in an area adjacent to one of the crank arms and which is activated, at each revolution of the crank arms, by a permanent magnet carried by one of the pedals in such a way as to supply one pulse per revolution to the electronic control unit mounted on board the bicycle. According to the prior art, the magnetic-activation device is fixed, as already said, on the frame of the bicycle. According to the present invention, instead, the integrated control-unit and power-supply assembly is exploited also for mounting one or more sensors, for instance a sensor of the type described above, designed to detect the pedal cadence. The above result can be obtained in a particularly advantageous way by means of the arrangement that forms the subject of the prior U.S. patent application Ser. No. 10/193,009 already cited above, according to which the assembly is mounted on the frame in the area where the bottle cage is fixed, or else also according to the arrangement that forms the subject of a further co-pending patent application in the name of the present applicant, filed on the same date as the present application, according to which the assembly is mounted on the frame of the bicycle underneath the bottom-bracket shell or crank case. In both cases, the control-unit box includes a receptacle-like tubular appendage for connection to the battery holder, which preferably consists of an elongated cylindrical body. In the former case, the battery holder extends parallel to the down tube of the frame to which the bottle cage is fixed. In the latter case, the battery holder extends in a direction substantially parallel to one of the two chain stays.

Preferably, the aforesaid magnetic-activation sensor (or any other sensor) is set at one end of the cylindrical battery holder, which, in the condition of mounting on the bicycle, is adjacent to one of the crank arms.

Consequently, the invention enables a further advantage to be added to the control-unit and power-supply assembly forming the subject of the patent applications referred to above. Again according to what is proposed in the prior U.S. patent application Ser. No. 10/193,009, the battery holder is preferably received, in a disconnectable way, inside the receptacle-like tubular appendage of the control-unit box. Consequently, placing of the sensor device on the battery holder makes it possible to carry out any operation on the sensor device with extreme ease and rapidity. At the same time, the sensor device can be mounted without the need to carry out a special operation, in so far as it is sufficient for this purpose to connect the batter holder to the control-unit box.

BRIEF DESCRIPTION OF THE DRAWINGS

Further characteristics and advantages of the present invention will emerge from the ensuing description, with reference to the attached drawings, which are provided purely by way of non-limiting example and in which.

DETAILED DESCRIPTION OF THE INVENTION

Figure 1:
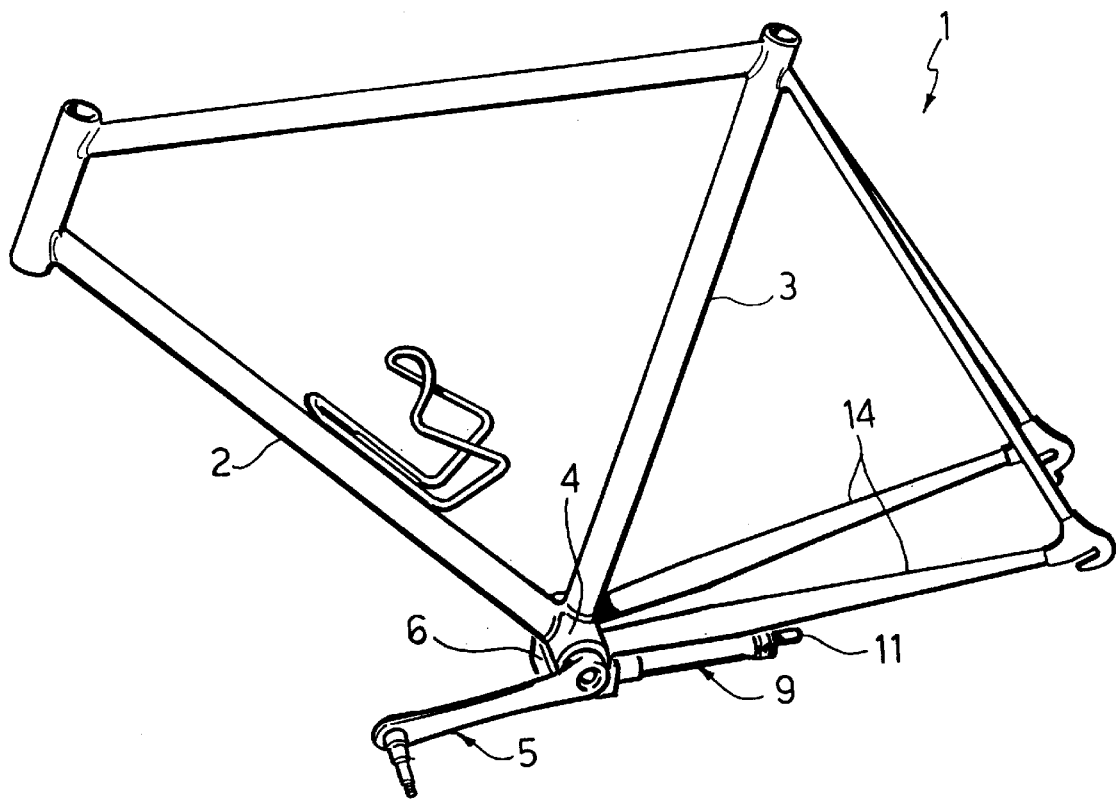
FIG. 1 is a perspective view of a first embodiment of the assembly according to the invention.

In FIG. 1, the reference number 1 designates, as a whole, a bicycle frame comprising a down tube 2 and a seat tube 3 which converge in a crank case 4 supporting, in a rotating way, a crank pin to which the crank arms 5 are connected (only one crank arm being illustrated in the drawing).

In line with a co-pending patent application filed by the present applicant, underneath the crank case 4 is fixed a box 6 for containing an electronic control unit for controlling the various electronic components mounted on board the bicycle. Again in line with the aforesaid co-pending patent application, the control-unit box 6 has, at its top, a cradle-like surface 7 designed to engage the bottom surface of the crank case 4 (see FIG. 2) and is moreover provided with a receptacle-like tubular appendage 8 designed to receive, by fast-coupling means, the end of a cylindrical battery holder 9. In a way similar to what is illustrated in the prior U.S. patent application Ser. No. 10/193,009, the battery holder 9 has, at one of its ends, electrical contacts consisting of metal rings 10, insulated with respect to one another, which co-operate with contacts set inside the receptacle-like appendage 8, in such a way that, when the battery holder 9 is connected inside the receptacle 8, there is obtained both the mechanical connection between the box 6 and the battery holder 9 and the electrical connection of the batteries which are set inside the battery holder 9 to the electronic control unit.

According to the invention, mounted at the distal end of the battery holder 9 is a magnetic-activation sensor device 11 which co-operates with a magnet 12 (FIG. 2) fixed to one end of the pin 13 of one pedal of the bicycle. The sensor 11 is set at a distance from the crank pin that is substantially equal to the length of the crank arm. Consequently, at each passage of the pedal in front of the sensor 11, the latter sends a signal to the electronic control unit set inside the box 6, by means of an electrical connection set in part inside the battery holder 9 and in part consisting of the connection of a further ring contact set on the outer surface of the battery holder 9 and a complementary contact set inside the receptacle 8.

Figure 2:
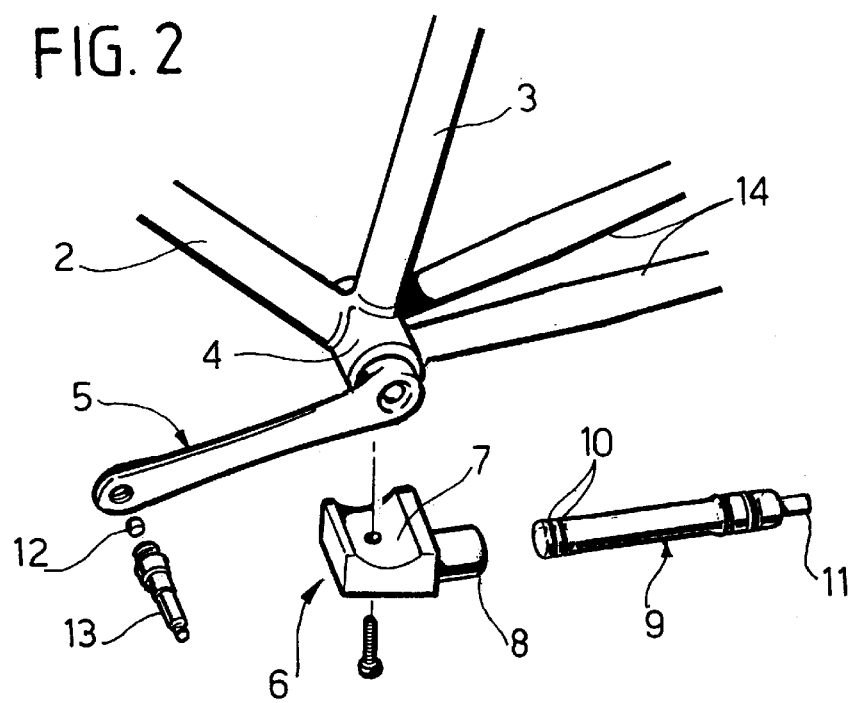
FIG. 2 is an exploded perspective view of the assembly of FIG. 1.

As may be seen in FIGS. 1 and 2, in the aforesaid embodiment, in the condition where the battery holder 9 is mounted on the bicycle it extends substantially parallel to one of the chain stays 14.

Figure 3:
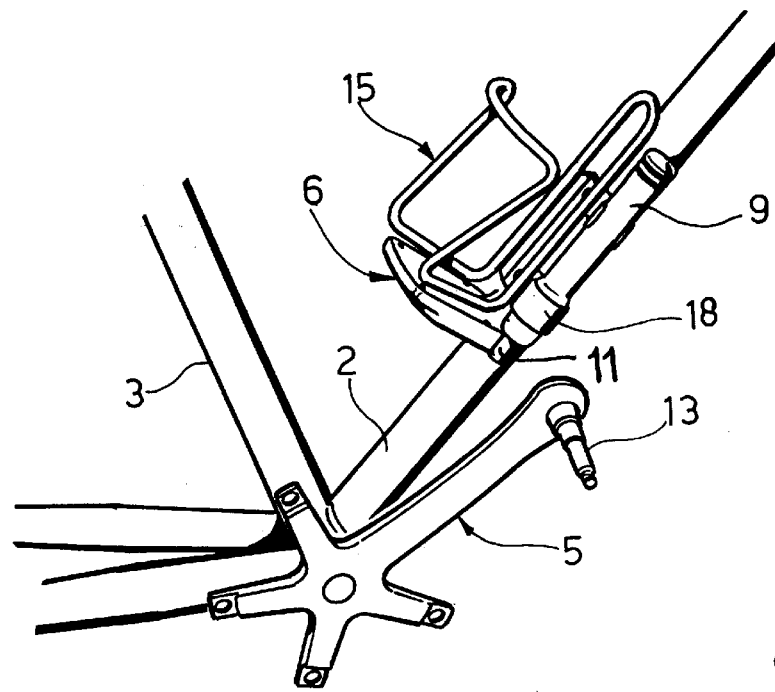
FIG. 3 illustrates a second embodiment of the assembly according to the invention.
Figure 4:
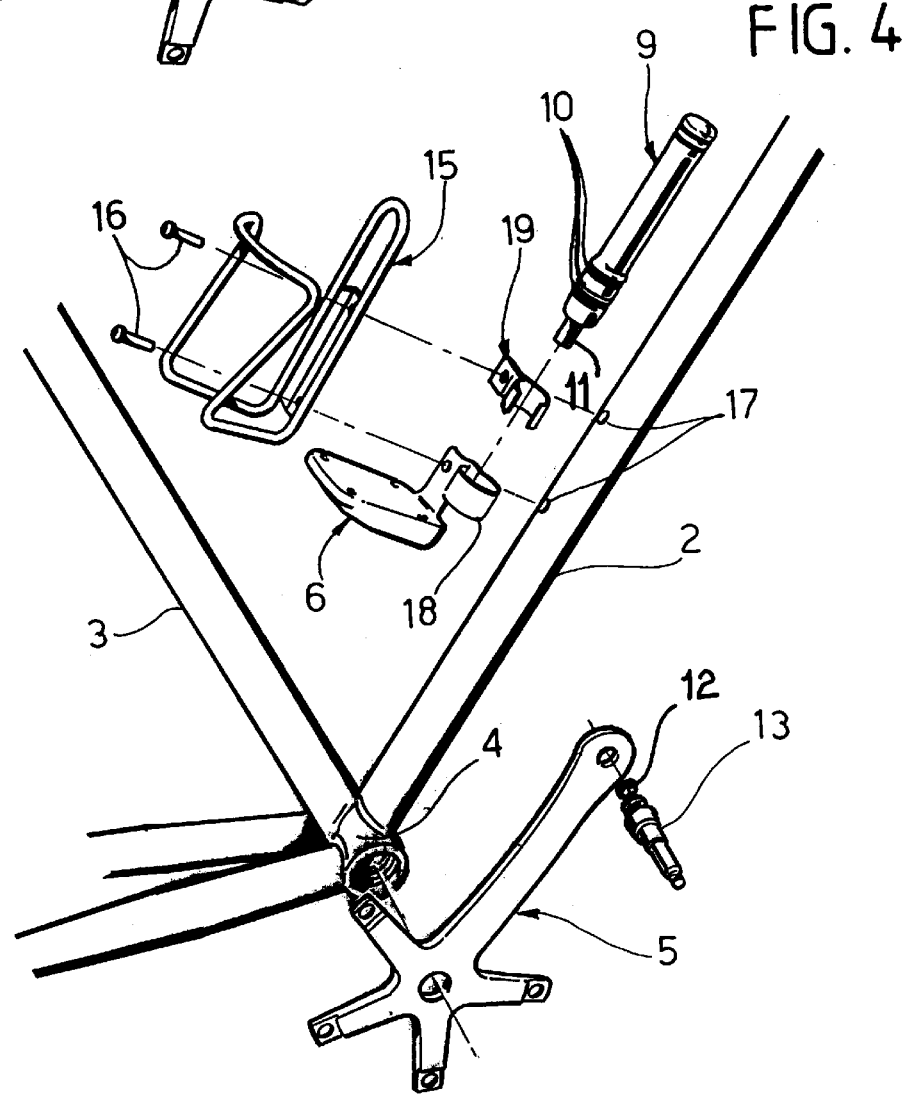
FIG. 4 is an exploded perspective view of the assembly of FIG. 3.

FIGS. 3 and 4 illustrate a variant which refers to the mounting of the control-unit and power-supply assembly in an area corresponding to the area where the bottle-cage is fixed, in accordance with what is proposed in U.S. patent application Ser. No. 10/193,109 in the name of the present applicant. In line with said prior patent application, in this case the control-unit box 6 presents a flattened body set beneath the bottle-cage supporting device 15 mounted by means of screws 16 which engage two threaded holes 17 made in the down tube 2 of the bicycle frame. Also in this case the control-unit box 6 has a tubular appendage (in this case, a through appendage) 18 designed to receive, by fast-coupling means, the end of the battery holder 9 carrying the ring-shaped electrical contacts 10. Again in line with the prior proposal of the present applicant, the battery holder 9 is moreover kept in a stable condition by a further flange 19 fixed, by means of one of the two screws 16, at the hole 17 made at the top, the box 6 having, instead, a flange fixed at the other hole 17 by means of the other screw 16. As may be seen in FIG. 4, the magnetic-activation sensor device 11 is set at the bottom end of the battery holder 9 in such a way as to be in the proximity of the radius of action of one of the pedals. Also in this case, the sensor 11 co-operates with a permanent magnet 12 mounted at the end of the pin 13 of one pedal (in this case, the pedal mounted on the right-hand crank arm 5, instead of the one mounted on the left-hand crank arm, as, instead, in the case of FIG. 1).

Of course, without prejudice to the principle of the invention, the details of construction and the embodiments may vary widely with respect to what is described and illustrated herein purely by way of example, without thereby departing from the scope of the present invention. In particular, it is possible to envisage more than one sensor device on the assembly according to the invention, and the sensors may moreover be of various types, even altogether different from the one mentioned above purely by way of example. It may moreover be envisaged that the sensor is mounted on the control-unit box, instead of on the battery holder, even though the latter solution is preferred in so far as it enables removal or mounting of the sensor by simply disconnecting or connecting the battery holder to the respective receptacle provided on the control-unit box.

It is, for instance, possible to envisage a further sensor that may be used for emitting a signal indicating the speed of rotation of the rear wheel of the bicycle. This solution can be adopted, for example, in the case of the embodiment illustrated in FIGS. 1 and 2, where the distal end of the battery holder 9 is adjacent to the rear wheel of the bicycle.

What is claimed is:

1. An integrated control and power assembly for use on a bicycle having a frame with a down tube and a seat tube, a bottle-cage receiving area defined by bottle-cage anchor points on the down tube, a crank case which connects the down tube and seat tube on a top surface of the crank case, at least one crank arm, and at least one pedal, the assembly comprising:

a box for containing an electronic control unit;

a battery holder, connected to the control unit box, for containing one or more electric power-supply batteries; and, at least one sensor device, "to detect movement of the crank arm and the pedal assembly and transmit a signal to the control unit"

wherein said control unit box has at least one tubular appendage for quickly receiving the battery holder, and wherein the crank case has a bottom surface substantially opposite the top surface.

2. The device according to claim 1, wherein said at least one sensor device is mounted on said battery holder.

3. The device according to claim 2, wherein said at least one sensor device is a magnetic-activation sensor designed to co-operate with a permanent magnet operatively associated with the at least one pedal to emit a signal at each revolution of the at least one crank arm, said assembly being designed to be mounted on a bicycle frame in a position such that the sensor is at a distance from the crank case of the bicycle that is substantially equal to a length of the at least one crank arm.

4. The assembly according to claim 3, wherein said control unit box further comprises a member attachable to the down tube of the bicycle frame, in the bottle-cage receiving area, on the bottle-cage anchor points.

5. The assembly according to claim 3, wherein said control unit box is formed for mounting on the bottom surface of the crank case.

6. The assembly of claim 1 wherein the at least one sensor device is mounted on the control unit box.

7. An integrated control and power assembly for use on a bicycle having a frame with a down tube and a seat tube, a bottle cage housed in a bottle-cage receiving area defined by bottle-cage anchor points on the down tube, a crank case which connects the down tube and seat tube on a top surface of the crank case, at least one crank arm, and at least one pedal, the assembly comprising:

an electronic control unit having a signal connection and power supply connection;

an electronic control unit box containing the electronic control unit;

a battery holder, connected to the control unit box, for supplying power to the electronic control unit; and, at least one sensor device to detect movement of the at least one pedal and transmit a signal to the electric control unit signal connection.

8. The assembly according to claim 7, wherein the at least one sensor device is mounted to the electronic control unit box.

9. The assembly according to claim 7, wherein the at least one sensor device is mounted to the battery holder.

10. The assembly according to claim 9, wherein the electronic control unit box is conformed to attach between the bottle-cage anchor points and the bottle cage.

11. The assembly according to claim 10, wherein the at least one sensor device is a magnetic activation sensor designed to cooperate with a permanent magnet, operatively associated with the at least one pedal, to emit a signal at each revolution of the at least one crank arm.

12. The assembly according to claim 7, wherein the electronic control unit box further comprises a tubular appendage having electrical contacts, and having an open end which receives and frictionally secures the battery holder.

13. The assembly according to claim 7, wherein the electronic control unit box is shaped to conform to a bottom surface of the crank case, located substantially opposite to the top surface, and includes at least one attaching member for securement to the bottom surface.

14. The assembly according to claim 13, wherein the at least one sensor device is a magnetic activation sensor, designed to cooperate with a permanent magnet operatively associated with the at least one pedal, to emit a signal at each revolution of the at least one crank arm.

15. The assembly according to claim 13, wherein the at least one sensor device is a magnetic activation sensor, designed to cooperate with a permanent magnet operatively associated with at least one bicycle wheel, operatively associated with the bicycle frame, to emit a signal at each revolution of the at least one bicycle wheel.

16. A combination bottle cage and integrated control and power assembly for use on a bicycle, having a down tube, a seat tube, a bottle-cage receiving area defined by bottle-cage anchor points on the down tube, a crank case which connects the down tube and seat tube on a top surface of the crank case, at least one crank arm, and at least one pedal, the assembly comprising:
- a bottle-cage;
- an electronic control unit having a signal connection and power supply connection;
- an electronic control unit box, connected to the bottle cage, containing the electronic control unit and attachable to the anchor points;
- a battery holder, connected to the control unit box, for supplying power to the electronic control unit; and,
- at least one sensor device to detect movement of the at least one pedal and transmit a signal to the electric control unit signal connection.

17. The assembly according to claim 16, wherein the at least one sensor device is mounted to the electronic control unit box.

18. The assembly according to claim 16, wherein the electronic control unit box is conformed to attach between the bottle-cage anchor points and the bottle cage.

19. The assembly according to claim 18, wherein the at least one sensor device is mounted to the battery holder.

20. The assembly according to claim 18, wherein the at least one sensor device is a magnetic activation sensor designed to cooperate with a permanent magnet, operatively associated with the at least one pedal, to emit a signal at each revolution of the at least one crank arm.

21. The assembly according to claim 16, wherein the electronic control unit box further comprises a tubular appendage having electrical contacts, and having an open end which receives and frictionally secures the battery holder.

22. A bicycle comprising:
- a frame having a down tube and a seat tube,
- a crank case, which connects the down tube and seat tube on a top surface of the crank case, having an anchor point on a bottom surface of the crankcase, the bottom surface located substantially opposite to the top surface;
- at least one crank arm operatively associated with the crank case;
- at least one pedal attached at an end of the crank arm;
- an electronic control unit having a signal connection for receiving a signal and a power supply connection;
- an electronic control unit box, containing the electronic control unit and attachable to the anchor points;
- a battery holder, connected to the control unit box, for supplying power to the electronic control unit; and,
- at least one sensor device to detect movement of the pedal and transmit a signal to the electric control unit signal connection.

23. The bicycle according to claim 22, wherein the at least one sensor device is mounted to the electronic control unit box.

24. The bicycle according to claim 22, wherein the at least one sensor device is mounted to the battery holder.

25. The bicycle according to claim 24, wherein the electronic control unit box further comprises a tubular appendage having electrical contacts, and having an open end which receives and frictionally secures the battery holder.

26. The bicycle according to claim 25, wherein the at least one sensor device is a magnetic activation sensor designed to cooperate with a permanent magnet, operatively associated with the at least one pedal, to emit a signal at each revolution of the at least one crank arm.

27. The bicycle according to claim 25, wherein the at least one sensor device is a magnetic activation sensor designed to cooperate with a permanent magnet, operatively associated with at least one bicycle wheel, operatively associated with the bicycle frame, to emit a signal at each revolution of the at least one bicycle wheel.

28. The bicycle according to claim 26, wherein the electronic control unit box is shaped to conform to a bottom surface of the crank case, located substantially opposite to the top surface, and includes at least one attaching member for securement to the bottom surface.

29. The bicycle according to claim 27, wherein the electronic control unit box is shaped to conform to a bottom surface of the crank case, located substantially opposite to the top surface, and includes at least one attaching member for securement to the bottom surface.

30. An integrated control and power assembly for a bicycle having a frame with a down tube connected to a crank case including at least one crank arm and pedal assembly, the control and power assembly comprising:
- an electronic control unit box having a power receptacle and a holding area;
- a battery holder for at least one battery, the holder having shape that is received within the holding area and a power outlet that connects with the power receptacle to supply energy to the electronic control unit box; and,
- at least one sensor mounted on the power assembly for detecting movement of the crank arm and pedal assembly and generating a signal that is transmitted to the electronic control unit box.

31. The power assembly according to claim 30, wherein the at least one sensor is mounted on the electronic control unit box.

32. The power assembly according to claim 30, wherein the at least one sensor is mounted on the battery holder.

33. The power assembly according to claim 30, wherein the down tube has a bottle-cage receiving area defined thereon and the electronic control unit box is configured for mounting in the bottle-cage receiving area.

34. The power assembly according to claim 30, wherein the at least one sensor is a magnetic activation sensor.

35. The power assembly according to claim 30, wherein the electronic control unit box is configured to complement a surface of the crank case for mounting thereon.

36. The power assembly according to claim 30, wherein the at least one sensor is a magnetic activation sensor operatively associated with a permanent magnet connected to the at least one crank arm and pedal assembly.

37. The power assembly according to claim 30, wherein the at least one sensor device detects movement of a bicycle wheel located on the bicycle frame and emits a signal for each revolution of the bicycle wheel.

38. The power assembly according to claim 30, wherein the at least one sensor is a magnetic activation sensor that cooperates with a permanent magnet located on the bicycle and generates a signal in response to movement of the permanent magnet.

\* \* \* \* \*